United States Patent [19]

Stahl et al.

[11] Patent Number: 4,775,477
[45] Date of Patent: Oct. 4, 1988

[54] CRANBERRY COLOR EXTRACTION

[75] Inventors: Howard D. Stahl, Scarsdale, N.Y.; Michael E. Bordonaro, Fort Lee, N.J.; David Nini, Bronx, N.Y.

[73] Assignee: General Foods Corporation, White Plains, N.Y.

[21] Appl. No.: 115,472

[22] Filed: Oct. 30, 1987

[51] Int. Cl.$^4$ .............................................. B01D 13/00
[52] U.S. Cl. .................................... 210/641; 210/652
[58] Field of Search ................... 8/438; 210/641, 651, 210/652

[56] References Cited

U.S. PATENT DOCUMENTS

| | | | |
|---|---|---|---|
| 3,799,806 | 3/1974 | Madsen | 210/641 X |
| 4,083,779 | 4/1978 | Combe et al. | 210/23 H |
| 4,320,009 | 3/1982 | Hilton et al. | 210/651 |

OTHER PUBLICATIONS

Ion Exchange Purified Anthocyanin Pigments Ash Colorant for Cranberry Juice Cocktail, Jour. of Fd. Sci., 1973-Chiriboga & Francis.

An Anthocyanin Recovery System From Cranberry Pomace, J. Amer. Soc. Hort. Sci., 95(2):223-236—Chiriboga & Francis.

Anthocyanin Recovery From Cranberry Pulp Wastes by Membrane Technology-A. H. Woo et al., vol. 24, (1980), Jr. of Food Sci., pp. 875-879.

Primary Examiner—Frank Spear
Attorney, Agent, or Firm—Thomas A. Marcoux; Michael J. Quillinan; Daniel J. Donovan

[57] ABSTRACT

A process for the extraction of cranberry presscake is disclosed which involves the steps of grinding the presscake, preferably with a filter aid like rice hulls, subjecting this mixture to water extraction, microfiltering the extract to remove colloidal high molecular weight components and passing the microfiltered extract through reverse osmosis to recover a red-colored solution.

11 Claims, No Drawings

CRANBERRY COLOR EXTRACTION

BACKGROUND OF THE INVENTION

1. Technical Field

This invention relates to an aqueous process for the production of cranberry extracts and more particularly to a process for recovering various color and solid values from cranberry presscake and the product of such process. Whereas the major focus of this invention has to do with the treatment of cranberries it will be seen as equally applicable to other natural color wastes such as grape waste, roselle, black currant, etc. which are similarly benefitted by removal of astringent and/or bitter flavor principles to be hereinafter discussed.

2. Background Art

Heretofore, cranberry presscake, a waste product of cranberry juice extraction, has been considered as a source of red color but its bitter and astringent off-flavors restricted its utility to low levels of usage or as a colorant for cranberry beverages such as cranberry cocktail. An approach by Chiriboga, et. al., Ion Exchange Purifed Anthocyanin Pigments As A Colorant For Cranberry Juice Cocktail, Journal of Food Science, volume 38 (1973) pp. 464–467 has been to separate the color components from the cranberry extract with ion exchange resins. Other art teaches acidic methanol and ethanol as preferred over water as an extractant.

Cranberry presscake is available at multiple sites where juice is produced. However, because it is a waste material, it cannot be shipped for processing because of potential microbiological problems and/or cost. Most desirably an aqueous process would be employed for the present process, on site so-to-speak, at the cranberry processing plant where the presscake would be available as a byproduct.

DISCLOSURE OF THE INVENTION

The present invention relates to a simple aqueous process for producing an aqueous extract containing cranberry color and other solids from cranberry presscake which minimizes astringent and bitter off-flavors. The cranberry presscake may preferably contain rice hulls of a minor weight as a filter press aid; corn husks, wheat hulls bleached or cleaned paper and other non-starchy hull or shell fragments may also be employed in lieu of the rice hulls. Such filter press aids remain intact and yet maintain adequate bulking through the subsequent processing to be hereinafter described. Generally such hull or shell fragments are used in an amount adequate to bulk with the presscake and are employed at a minor percent by weight (dry weight) of the presscake, typically at a level of from 15% to 45% preferably from 25% to 35%.

By first comminuting the cranberry presscake "as is" Preferably with the filter aid present, followed by aqueous extraction with minimal shear and contact time, acceptable extraction efficiencies can be obtained without pH adjustments or other complicated schemes. Also, by selecting optimum porosity of a microfiltration membrane followed by reverse osmosis with a level of salt rejection between 90% and 99.5%, the final desired properties of the extract are afforded. In this manner, it is possible to obtain an extract low in high molecular weight solids which aid in redispersion of the product in cold water while minimizing the amount of carrier, for example maltodextrin, magnesium hydroxide, etc., otherwise required in spray-drying or other drying. It is found that this process eliminates or reduce substantially the astringency or bitter harsh flavor found in the finished extract.

The present process is simple and requires few steps. With proper comminution of the cranberry presscake, by grinding "as is" without substantial added water, the cranberry presscake solids together with the hulls and/or shell fragments which may be incorporated are reduced in size to aid in the aqueous extraction of the cranberry solids, while the rice hulls or equivalent if present are left relatively intact to aid in subsequent further separation and filtration of the extract from the residual waste presscake. The present invention is founded in part on the discovery that grinding the presscake and a filter aid under high shear conditions, such as is practiced in a Waring Blender, yields a wet mass wherein very little color value extracted. It is speculated that the color is reabsorbed on the polymeric carbohydrates (e.g. cellulose, hemicellulose, and pectin) in the macerated mixture of cranberries and rice hulls or equivalent found in the presscake mixture. However, when ground properly according to the present process, the rice hulls will not excessively absorb the cranberry color.

The present invention does not necessitate the use of solvents, acids or bases in the process for extraction and thereby minimizes cost, making it possible to place the process directly in an existing juice extraction facility. By the correct selection of the microfiltration membranes for subsequent clarification followed by reverse osmosis it is now possible to tailor the composition of the extract to optimize its physical Property, resulting in a product which is considered natural and free of Food and Drug labeling requirements.

BEST MODE FOR CARRYING OUT THE INVENTION

Cranberry presscake, is preferably held in frozen storage at say 0° F. until ready-for-use. The frozen presscake is the ideal material to be processed, although other forms will suggest themselves from the following description and it is not essential that the presscake be frozen though it should be kept cool i.e., below 80° F., prior to use to minimize bacterial growth.

The cranberry presscake preferably frozen, is prepared by ,grinding or comminuting it to produce a ground presscake having a size between 1/16 to ½ inch. After comminution of the presscake, preferably in combination with the filter aid, it is extracted at a water to presscake-filter aid weight ratio of 4:1 to 15:1 at a temperature of 70° to 160° F. and preferably 110° to 140° F., most preferably about 130° F. for a time ranging from 5–60 minutes depending upon conditions of extraction. The extraction can be done in conventional extraction equipment, in countercurrent fashion or multiple batch extractions can also be performed.

The extract is preferably separated from the spent presscake by one of several bulk separation processes known to those skilled in the art, for example, centrifugation, screening, pressing and filtration. This bulk separation step should preferably produce an extract containing within the range of from 0.3 to 1.5% T.D.S. to maximize the efficiency of microfiltration.

Microfiltration is next employed to remove suspended solids and colloidal high molecular weight components e.g., protopectin components from the liquor and thereafter the microfiltration product is sent directly to a feed tank for the final principal stage of the operation, reverse osmosis. The membrane porosity of the microfiltration membrane can vary from 0.5 to 3.0 microns. At porosities greater than 3 microns, some of the pectin is passed through the membrane. At too low a porosity, i.e., below 0.5 microns, color is rejected in part. The temperature of the extract undergoing microfiltration will broadly range from 70° F. to 140° F., a slightly elevated temperature of 120° F. being preferred. The inlet pressure of extract passing the membrane will range from say 3 to 8 bars; the outlet pressure will range from 1 to 4 bars.

The permeate from microfiltration is subjected to reverse osmosis. The membrane for reverse osmosis may comprise a composite polyamide, polyether, polyether urea, polyamide or a non-composite such as cellulose and regenerated cellulose, polysulfone; the preferred polymeric membrane being Filmtech F.T. 30 (a polyamide type composite having a salt rejection capacity of 99.2%). During reverse osmosis the temperature of the extract will be anywhere from 80° to 140° F. and preferably about 120° F., the pressure of the feed being broadly 300 to 900 psig. Preferably, a thin film membrane process consisting typically of the use of a multiple thin film elements in close proximity is used, the membrane having a salt rejection efficiency in excess of 90% and typically in excess of 99.0%. The reverse osmosis retentate is typically 10% solids and can be high as 25%. The concentrated Product from reverse osmosis, may be further concentrated and dried depending upon intended use conditions as is apparent from the following example.

The product is a low viscosity extract possessing a minimal concentration of high molecular weight carbohydrates including pectinaceous matter, protein and offensive polyphenolics. The product is partially debittered and capable of providing a sparkling clear, red-colored solution. However, the extract will contain substantially all of the beneficial organic constituents found in cranberry juice, i.e., natural acids, sugars, amino acids, low molecular weight peptides, salt and anthocyanins.

EXAMPLE 1

Cranberry presscake having a solid content of 30% in frozen presscake form is comminuted in a Fitz Mill, Model D using a ⅜ inch square screen to achieve a coarse, common unit of meal having a size in the order of ¼ of an inch. Grinding of the frozen presscake occurs in the presence of approximately 27 to 31% by weight of rice hulls.

Next, approximately 760 lbs. of heated water was added to 96 pounds of the presscake/rice hulls mixture resulting in a slurry having a temperature of 140° F. The ground cranberry presscake-rice hulls mixture is subjected to water extraction at an added water/presscake-rice hulls ratio of 8:1 under low shear mixing. Extraction was conducted in a 30 gallon Hobart mixer. Due to the size of the kettle, extraction consisted of 5 batches each yielding a 8:1 water/presscake-rice hulls mixture. Each subbatch was stirred for 10 minutes prior to separation. After combining the subbatches, the extract was filtered in a basket centrifuge, the slurry of solids being added until the cake is built-up in the filter bag and the filtrate flow rate slowed significantly. A total of approximately 81 gallons (675 pounds) of colored extract was collected from the five subbatches and placed in two 50 gallon drums and stored in a cold room at approximately 40° F. overnight to protect from spoiling. The extract contained 0.48% solid (T.D.S.).

The water temperature during such extraction was about 130° F. whereat leaching without extensive swelling of the presscake occured. For the batch operation herein expressed, the mixture is subjected to, stirring for 10 minutes for each batch. It is important to avoid extensive contact between the extract and the presscake-rice-hulls mixture to prevent reabsorption of the color by the rice hulls and presscake.

Whereas the best mode for practicing the invention in terms of extraction has been a stirred tank system, it is within the ambit of the invention that any means to effect such extraction may be employed and indeed it is contemplated that a continuous counter-current extraction operation be employed using a screw in a trough.

The next phase of the process involved microfiltration of the extract to remove colloidal high molecular weight components. To facilitate this clarification, the extract was pre-filtered through a Filterite filter cartridge. Thereafter during microfiltration, a polymeric membrane (polysulfone), with a porosity of 1 micron was used. The temperature of the extract undergoing microfiltration was 120° F. The inlet pressure of extract passing the membrane was 4.4 bars; the outlet pressure was in the order of 2.2 bars. Microfiltration produced a clear permeate containing 95% or more of the original color present in the extract as well as all dissolved organics such as sugars, acids, proteins and amino acids. The retentate may be discarded, used as a source of pectin in food products or as a source of dietary fiber. The permeate contained 0.48% solids. The microfiltration medium is of a tubular or thin-channel configuration. There is a viscosity decrease of the liquid passing the microfiltration device approaching that of plain water, water being about 0.9 centipoise at room temperature.

Next, the permeate from the microfiltration operation is subjected to reverse osmosis. A polymeric membrane (Filmtech F.T. 30), a polyamide type composite having a salt rejection capacity of 99.2% was utilized for reverse osmosis. During reverse osmosis the temperature of the extract was 120° F., the pressure of the feed was 650 psig.

As a result of reverse osmosis, a clear permeate which is discarded is obtained containing substantially no color and some of the astringent phenolic components found in cranberry extracts of the prior art, as explained heretofore. The retentate of the reverse osmosis steps contained 14.9% solids. The retentate had a total anthocyanin content of 520 mgs. per liter. The retentate can be dried or concentrated further and used as a coloring agent per se or a source of food solids.

The, reverse osmosis retentate can be used as such or it may be further concentrated. The liquid may be spray dried, vacuum drum dried or freeze dried. A typical spray-drying may be accomplished in a Niro Atomizer with an inlet air temperature of 276° F. and an outlet air temperature of 167° F. The cold water dispersability of the spray-dried powder, may be increased by the addition of 1.5% by weight of tricalcium phosphate to the powder, all of which comes within the skill of the art.

What is claimed is:

1. A process for the extraction of cranberry presscake comprising the steps of grinding the presscake to obtain a ground presscake having a size between 1/16 to ½ inch, subjecting the ground presscake to a water extraction, microfiltering the extract to remove colloidal high molecular weight components and thereafter subjecting the filtrate to reverse osmosis to recover a feed of a red-colored solution passing the reverse osmosis membrane.

2. The process of claim 1 wherein the presscake is blended with a minor weight percent of filter aid.

3. The process of claim 2 wherein the filter aid is rice hulls.

4. The process of claim 2 wherein the cranberry presscake and filter aid incorporated at a level of from 15% to 45% by weight (dry weight) of filter aid is subjected to a water extraction wherein the water/presscake-filter aid ratio is 4:1 to 15:1, said extraction occurring at a temperature of from 70° F. to 160° F. for a period of time of from 5 to 60 minutes.

5. The process of claim 4 wherein microfiltration of the extract is performed by filtration through a membrane having a porosity of 0.5 to 3.0 micron.

6. The process of claim 5 wherein the inlet temperature of the extract undergoing microfiltration will range from 70° to 140° F., inlet pressure of the extract passing the microfiltration membrane ranges from 3 to 8 bars and the outlet pressure ranges from 1 to 4 bars.

7. The process of claim 6 wherein the reverse osmosis is conducted by the use of a membrane having a salt rejection capacity greater than 90% and wherein reverse osmosis is conducted at temperatures of 80°-140° F.

8. The process of claim 7 wherein the extract undergoing reverse osmosis is at a temperature of 80°-140° F. and the feed pressure ranges from 300 to 900 psig.

9. The product of the process of claim 1.

10. The product of the process of claim 4.

11. The product of the process of claim 8.

* * * * *